Dec. 5, 1967 C. O. WEISENBACH 3,355,886
HYDROSTATIC TRANSMISSION
Filed Oct. 23, 1965

INVENTOR
CHARLES O. WEISENBACH

BY
ATTORNEYS

United States Patent Office 3,355,886
Patented Dec. 5, 1967

3,355,886
HYDROSTATIC TRANSMISSION
Charles O. Weisenbach, Watertown, N.Y., assignor to The New York Air Brake Company, a corporation of New Jersey
Filed Oct. 23, 1965, Ser. No. 503,903
6 Claims. (Cl. 60—53)

ABSTRACT OF THE DISCLOSURE

A hydrostatic transmission including a pair of parallel-connected motors, and a limited slip differential. The differential comprises a pair of control circuits, each of which contains a small pump driven by one of the motors, and a regulating valve which imposes on the pump a backpressure which varies linearly with pump discharge rate. A throttle valve responds to the differential between the backpressures and restricts flow through whichever motor is running at the higher speed whenever the differential exceeds a predetermined value.

---

This invention relates to hydrostatic transmissions in which a closed transmission circuit connects a pair of motors in parallel flow relation with the transmission pump.

When a transmission of this kind is used to drive the propulsion wheels of an off-the-road vehicle, which often is required to operate on muddy or slippery terrain, it should include a limited slip differential that limits the speed of the spinning wheel and insures that the remaining wheel will be capable of delivering torque to the ground. One known way of accomplishing this result is to incorporate in the transmission circuit a valving device of the type disclosed in U.S. Patent 2,956,577, granted Oct. 18, 1960. This device includes a throttling valve which serves selectively to restrict the flow through one or the other of the motors, and a pair of fixed metering orifices which are interposed in the motor-operating subcircuits and develop control pressures which are used to actuate the throttling valve. Since the pressure drop across an orifice is proportional to the square of the flow rate, and all of the operating fluid which passes through a motor must also pass through the associated metering orifice, it is evident that this method of providing a limited slip differential entails rather large energy losses in cases where the transmission must operate over a wide range of speeds.

The object of the present invention is to provide a hydrostatic transmission having a limited slip differential which can be operated over a wide range of speeds without incurring the energy loss penalty characteristic of the prior scheme just mentioned. According to the invention, the control pressures used to actuate the throttling valve are developed in secondary circuits in which the rates of flow are proportional to but much smaller than those encountered in the closed transmission circuit, and these control pressures are so regulated that they vary linearly with the speed of the associated motor. This method of generating the control pressures is inherently more efficient than the prior scheme first mentioned, and, therefore, the invention makes practical the use of the limited slip feature in transmissions which operate over wide speed ranges.

The preferred embodiment of the invention is described herein with reference to the accompanying drawing in which.

Figure 1:
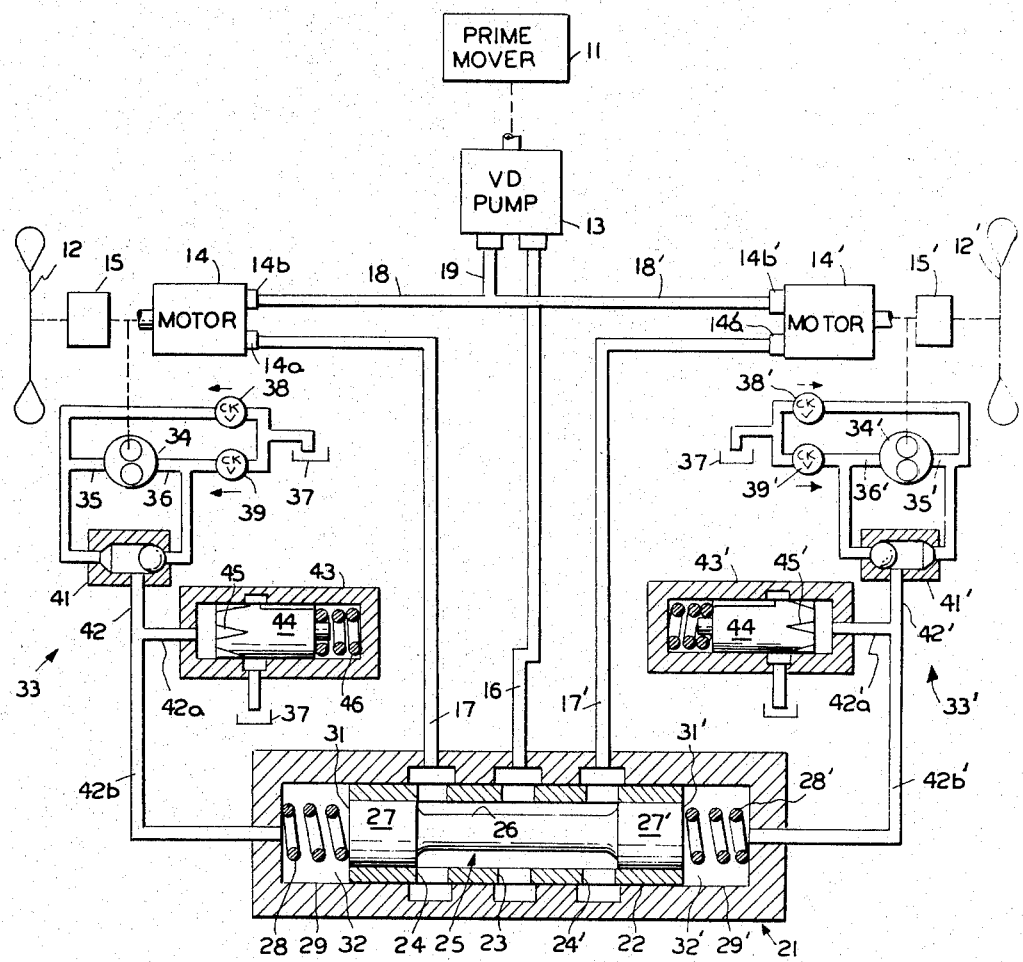
FIG. 1 is a schematic diagram of the improved transmission.

As shown in FIG. 1, the improved transmission is employed to transmit power from the prime mover 11 of a vehicle to the ground-engaging wheels 12 and 12'. The transmission includes a variable displacement, overcenter pump 13, which is driven by prime mover 11, and a pair of fixed displacement, reversible motors 14 and 14' which are connected to drive the wheels 12 and 12' through gear boxes 15 and 15', respectively. The motors 14 and 14' are identical, and each is provided with a pair of ports 14a and 14b or 14a' and 14b'. For purposes of the present description, it is assumed that the motors 14 and 14' drive the vehicle in the forward direction when ports 14a and 14a' are supplied with fluid under pressure, and that they drive the vehicle in the reverse direction when ports 14b and 14b' are serving as the inlet ports. The motors 14 and 14' are connected in parallel flow relation with pump 13 by conduits 16, 17, 17', 18, 18' and 19, which, together with the passages in throttling valve 21, define a close transmission circuit. It will be understood that, as in the case of most hydrostatic transmissions, the complete transmission includes a replenishing and relief circuit, such as the one disclosed in U.S. Patent 2,961,829, granted Nov. 29, 1960.

The throttling valve 21, which is interposed between conduit 16 and conduits 17 and 17', comprises a housing containing a fixed valve sleeve 22 formed with three spaced sets of radial passages 23, 24 and 24' which communicate, respectively, with conduits 16, 17 and 17'. Reciprocable in the sleeve 22 is a valve plunger 25, which is provided with a central peripheral groove 26 and a pair of end lands 27 and 27', and which serves selectively to restrict the flow between passages 23 and 24 or the flow between passages 23 and 24'. Valve plunger 25 is biased to the illustrated neutral position, wherein groove 26 establishes essentially free communication between passages 23 and passages 24 and 24', by a pair of centering springs 28 and 28'. The plunger is shifted in opposite directions from this position by a pair of control motors 29 and 29' defined by the end faces 31 and 31' of lands 27 and 27', respectively, and the working chambers 32 and 32'.

Figure 2:
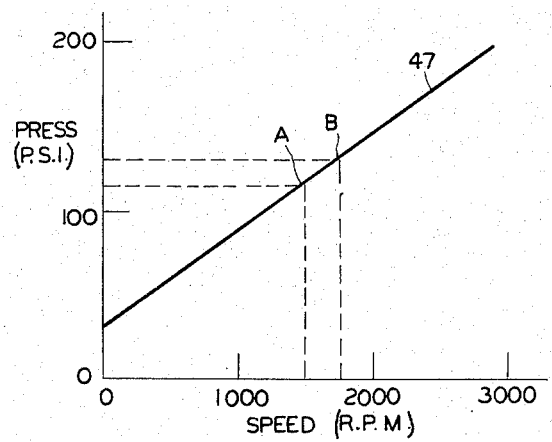
FIG. 2 is a graph showing a typical linear relationship between control pressure and motor speed.

The working chambers 32 and 32' of control motors 29 and 29' are supplied with hydraulic fluid at pressures which vary linearly with the speeds of motors 14 and 14', respectively, by a pair of control circuits 33 and 33'. Control circuit 33 includes a small positive displacement pump 34 which is driven by motor 14, and whose capacity is much less than the maximum capacity of pump 13. Depending upon the direction of rotation of motor 14, pump 34 discharges fluid to one or the other of a pair of conduits 35 and 36. These conduits 35 and 36 are connected with a reservoir 37 through check valves 38 and 39, respectively, so that, regardless of the direction of rotation, the conduit which is serving as the inlet connection will receive fluid from the reservoir, and the conduit which is serving as the discharge connection will be isolated from the part. Connected across conduits 35 and 36 is a pressure responsive shuttle valve 41 which serves to connect the higher pressure conduit with a control conduit 42 having a brance 42a that leads to reservoir 37 through a pressure regulating valve 43, and a branch 42b that leads to the working chamber 32 of control motor 29. The regulating valve 43 includes a reciprocable valve 44 which is formed with a plurality of tapered throttling notches 45 that define a flow restriction in branch 42a, and whose position determines the flow area of this restriction. The right end of valve member 44 is vented, and its left end is subjected to the pressure upstream of notches 45. The shifting force developed on this member by the upstream pressure is opposed by a coil compression spring 46. The force characteristics of spring 46 and the shape of notches 45 are so selected that the backpressure established in conduit 42, and consequently the pressure in working chamber 32, varies linearly with the discharge rate of pump 34. Since the output of pump 34 is directly proportional to the speed of motor 14, it follows that this backpressure also will vary linearly with motor speed, as indicated by the curve 47 in FIG. 2. Control circuit 33' is identical to circuit 33, and it will be understood that, within the limit of normal manufacturing tolerances, the two circuits produce the same pressure versus speed curve 47. The slope of this curve, which can be varied by changing the rates of the biasing springs in the regulating valves 43, is so correlated with the force characteristics of the centering springs 28 and 28' in the throttling valve 21 that the small speed differentials encountered in turning the vehicle will not cause the throttling valve to shift from its neutral position.

When the transmission is driving the vehicle in the forward direction, main pump 13 delivers oil under pressure to the inlet passage 23 of throttling valve 21 through conduit 16, and from there the fluid follows parallel paths to the suction conduit 19; one of these paths including plunger groove 26, passages 24, conduit 17, the internal passages in motor 14, and conduit 18, and the other path including plunger groove 26, radial passages 24', conduit 17', the internal passages of motor 14', and conduit 18'. Circulation of fluid through the closed transmission circuit causes motors 14 and 14' to develop the torque necessary to drive wheels 12 and 12' and the control pumps 34 and 34'. In this mode of operation, the two control pumps discharge to conduits 35 and 35', respectively, so shuttle valves 41 and 41' assume their illustrated conditions. Under normal driving conditions, motors 14 and 14' run at the same speed, and, therefore, the control pressures developed by the circuits 33 and 33' are equal. As a result, control motors 29 and 29' develop equal shifting forces, and centering springs 28 and 28' hold valve plunger 25 in its illustrated neutral position wherein there is substantially free flow between passages 23 and passages 24 and 24'.

If the vehicle encounters slippery terrain and wheel 12' loses traction, motor 14' will accelerate and cause control pump 34' to discharge fluid at a greater rate. The backpressure developed by valve 43' now rises above the backpressure developed by valve 43, as illustrated by the portion A–B of curve 47, and control motors 29 and 29' shift valve plunger 25 of throttling valve 21 to the left. This movement of the valve plunger causes land 27' to close progressively radial passages 24', and thereby throttle flow to motor 14'. As a result, the speed of this motor decreases, while motor 14' may continue to run at a speed higher than that indicative of point A in FIG. 2, the throttling action of valve 21 insures that motor 14 will receive fluid at full system pressure. Because of this, motor 14 will continue to develop full torque. When traction is regained at wheel 12', the speeds of the two motors 14 and 14', and the two control pressures, will again equalize. At this time, centering spring 28 will return valve plunger 25 to its neutral position.

If motor 14 loses traction, circuit 33 will develop the higher control pressure, and valve plunger 25 will be shifted to the right from its neutral position. Under this condition, land 27 throttles flow to motor 14, thereby causing it to decelerate, and insuring that motor 14' will develop full torque.

In the reverse mode of operation, pump 13 delivers oil to the motors through conduits 19, 18 and 18', and the throttle valve 21 serves selectively to restrict the return flows from motors 14 and 14' to conduit 16. Since the direction of rotation of pumps 34 and 34' has been reversed, they discharge to conduits 36 and 36', respectively, and shuttle valves 41 and 41' shift to positions in which these conduits communicate with the regulating valves 43 and 43', respectively. If one of the motors 14 and 14' should lose traction, the pressure developed by the associated control circuit will rise, and control motors 29 and 29' will shift valve plunger 25 away from the neutral position. The direction of shift will be such that valve plunger 25 restricts the exhaust flow from the spinning motor. As in the case of forward operation, this action of the throttling valve has the effect of retarding movement of the spinning motor, and of insuring that the other motor will receive full system pressure and develop full torque.

As stated previously, the drawing and description relate only to the preferred embodiment of the invention. Since changes can be made in the structure of this embodiment without departing from the inventive concept, the following claims should provide the sole measure of the scope of the invention.

What is claimed is:
1. A hydrostatic transmission comprising
   (a) a main pump;
   (b) first and second motors;
   (c) conduit means connecting the motors in parallel flow relation with the pump in a closed transmission circuit;
   (d) throttling valve means in the closed circuit and effective to selectively throttle the flows through the motors;
   (e) first and second means for developing control pressures that vary linearly with the speeds of the first and second motors, respectively, each means including a control pump which is driven by the motor and whose output is proportional to motor speed, and control means for creating a pressure that varies linearly with the discharge rate of the control pump; and
   (f) motor means responsive to the differential between said control pressures for causing the throttling valve means to restrict flow through the first motor when the first control pressure exceeds the second control pressure by a predetermined amount, and to restrict flow through the second motor when the second control pressure exceeds the first control pressure by a predetermined amount.

2. A hydrostatic transmission as defined in claim 1 which includes a reservoir, and wherein
   (a) the main pump is reversible;
   (b) each control pump has a pair of ports, each of which serves alternately as the inlet or discharge port depending upon the direction of operation of the associated motor; and
   (c) each of the first and second means includes a shuttle valve which responds to the differential between the pressures in the ports of the associated control pump and connects the higher pressure port with the control means, and means for connecting the lower pressure port with the reservoir.

3. A hydrostatic transmission as defined in claim 2 wherein each control means comprises
   (a) a control conduit which communicates with the reservoir and which is selectively connected with the ports of the control pump by the shuttle valve;
   (b) a variable area restriction interposed in said control conduit; and
   (c) means responsive to the pressure differential across the flow restriction for varying the area of the restriction in direct relation to the pressure differential;
   (d) the movement of the flow restrictor being so correlated with its shape that the pressure drop across it varies linearly with the flow rate through the control conduit.

4. A hydrostatic transmission as defined in claim 1 wherein
   (a) each of the motors and the pumps has a pair of ports;
   (b) the throttle valve means comprises
       (1) a housing containing first, second and third passages which, through the conduit means, are connected, respectively, with one port of the first motor, one port of the second motor and one port of the main pump, and (2) a movable valve member having a neutral position in which it establishes free communication between the third passage and each of the other passages, and being movable in opposite directions from that position, movement of the valve member in a first direction serving to progressively restrict flow between the first and third passages and movement in a second direction serving to progressively restrict flow between the second and third passages; and (e) the motor means comprises (1) centering spring means urging the valve member toward said neutral position, (2) a first motor responsive to the control pressure developed by the first means and urging the valve member in the first direction, and (3) a second motor responsive to the control pressure developed by the second means and urging the valve member in the second direction.

5. A hydrostatic transmission as defined in claim 4 including a reservoir, and wherein each of the first and second means includes (a) a pair of supply conduits connecting the ports of the control pump with the reservoir;

(b) a check valve in each supply conduit permitting flow away from but not toward the reservoir; and (c) a shuttle valve responsive to the differential between the pressure at the ports of the control pump for connecting the higher pressure port with the control means.

6. A hydrostatic transmission as defined in claim 5 wherein each control means comprises (a) a control conduit connected with the reservoir and to which the shuttle valve connects the higher pressure port of the control pump;

(b) a variable area flow restrictor interposed in the control conduit and including an element movable in opposite directions to increase and decrease, respectively, the flow area of the restrictor;

(c) spring means urging said movable element in the direction to decrease the area of the flow restrictor; and (d) means responsive to the pressure drop across the flow restrictor for urging the movable element in the direction to increase the flow area of the restrictor;

(e) the movable element being so designed that the flow area of the restrictor varies in a manner that produces a linear relationship between the pressure upstream of the restrictor and the flow rate through the restrictor.

References Cited

UNITED STATES PATENTS

| | | | |
|---|---|---|---|
| 2,846,849 | 8/1958 | Levetus et al. | 60—53 |
| 3,085,403 | 4/1963 | Hamblin et al. | 60—97 |
| 3,217,821 | 11/1965 | Dumas et al. | 60—97 X |

FOREIGN PATENTS

| | | |
|---|---|---|
| 232,349 | 4/1925 | Great Britain. |

EDGAR W. GEOGHEGAN, *Primary Examiner.*